United States Patent [19]

Huebner et al.

[11] 4,288,356

[45] Sep. 8, 1981

[54] POLYSILOXANE EMULSION ELASTOMERS REINFORCED WITH EMULSIFIED ORGANO-SILICONE COPOLYMERS

[75] Inventors: David J. Huebner; Donald R. Weyenberg, both of Midland, Mich.

[73] Assignee: Dow Corning Corporation, Midland, Mich.

[21] Appl. No.: 192,397

[22] Filed: Sep. 30, 1980

[51] Int. Cl.³ .............................................. C08L 83/06
[52] U.S. Cl. ...................... 260/29.6 NR; 260/29.2 M; 525/100; 525/102; 525/106
[58] Field of Search ............... 260/29.6 NR, 29.7 NR, 260/29.2 M; 525/100, 102, 105, 106

[56] References Cited

U.S. PATENT DOCUMENTS

| | | | |
|---|---|---|---|
| 3,004,956 | 10/1961 | Cox | 260/79.5 |
| 3,355,406 | 11/1967 | Cekada | 260/29.2 |
| 3,575,910 | 4/1971 | Thomas | 260/29.6 |
| 3,706,697 | 12/1972 | Backderf | 260/29.2 M |
| 3,879,491 | 4/1975 | Lindsey et al. | 260/827 |
| 3,898,300 | 8/1975 | Hilliard | 260/827 |
| 4,138,387 | 2/1979 | Bluestein | 525/100 |

FOREIGN PATENT DOCUMENTS 842947  5/1970  Canada ................... 402/16

Primary Examiner—Paul R. Michl
Attorney, Agent, or Firm—Roger H. Borrousch

[57] ABSTRACT

A method of blending an emulsion of an emulsion polymerized copolymer of an organic monomer and an organosilicon monomer and an emulsion of a polydiorganosiloxane to provide a reinforced elastomeric product is disclosed. The physical properties of the cured polydiorganosiloxane elastomeric product are improved by the addition of the copolymer emulsion, as compared to the addition of an organic homopolymer, particularly the tear strength. The blended emulsions and the product obtained by devolatilizing the blended emulsion is also claimed. The cured product is useful as a coating for surfaces, as a textile treatment, and as a paper treatment.

12 Claims, No Drawings

POLYSILOXANE EMULSION ELASTOMERS REINFORCED WITH EMULSIFIED ORGANO-SILICONE COPOLYMERS

BACKGROUND OF THE INVENTION

1. Field of the Invention

This invention relates to a silicone emulsion which yields a high strength elastomer. The silicone emulsion is reinforced with a curable organic-silicone copolymer emulsion.

2. Description of the Prior Art

Cox, in U.S. Pat. No. 3,004,956, discloses a copolymer polymerized in an emulsion. His copolymer is of alkyl esters of alpha beta unsaturated monocarboxylic acids and 1 to 6 percent by weight of a compound selected from the group consisting of vinyltrimethylsilane, allyltrimethylsilane, chloroallyltrimethylsilane, vinyltriethylsilane, chloroallyltriethylsilane, and allyltriethylsilane. After removal from the emulsion, the copolymer was vulcanized by combining it with a vulcanizing agent and heating. Cox discloses no usefulness for the copolymer in the emulsion form.

In U.S. Pat. No. 3,355,406, Cekada teaches a silicone latex prepared from a colloidal suspension of a curable essentially linear siloxane polymer and a silsesquioxane in the form of a colloidal suspension. Cekada further teaches that his silicone latex could be crosslinked with silanes of the general formula $A_m Si(OR)_{4-m}$, and catalyzed with condensation catalysts including mineral acids, strong bases, and dialkyltindiacetates. When this prepared latex was applied to a substrate and the water evaporated, a film of silicone rubber or plastic was left behind depending upon the polymer used in the latex. Cekada teaches that a silsesquioxane is an essential portion of his invention.

In U.S. Pat. No. 3,575,910, Thomas claims latex paints containing copolymers consisting essentially of 25 to 90 percent by weight of an acrylate and 10 to 75 percent by weight of a siloxane containing a vinylic radical. Thomas uses the copolymer emulsions and latex paints containing the copolymer emulsions to form coatings.

In Canadian Patent No. 842,947, Thomas includes blends of emulsion polymerized acrylate and emulsion polymerized siloxane which are pigmented and used as coatings on construction materials.

In U.S. Pat. No. 3,706,697, Backderf teaches self-curable polymers obtained by the emulsion polymerization of acryloxyalkylsilane monomers with one or more acrylic acid ester monomers. Other polymerizable comonomers up to about 64.5 percent by weight based on the total monomers may be included in the polymerization. Backderf teaches that his latex may be used per se, diluted to a lower solids content, or blended with polymer dispersions or latices of other rubbery or plastic materials. He does not teach any reason for doing so nor does he suggest any advantage in so doing.

Example 6 of U.S. Pat. No. 3,879,491 by Lindsey and Saam discloses a procedure for producing a polydiorganosiloxane modified styrene-acrylonitrile. A polydiorganosiloxane emulsion was added to a styrene and acrylonitrile mixture which was then emulsion polymerized. The styrene-acrylonitrile copolymer, after removing from the emulsion, was molded and tested to show improved impact strength.

A similar process for producing copolymers of styrenic monomers and emulsified polyorganosiloxane is taught by Hilliard in U.S. Pat. No. 3,898,300.

The cited art does not teach using the copolymers in emulsion form to reinforce a polydiorganosiloxane elastomer.

SUMMARY OF THE INVENTION

This invention describes a method of producing silicone elastomers through a blending process, said silicone elastomers being reinforced with an emulsion polymerized organic copolymer to yield products with improved physical properties. A method comprises mixing an aqueous emulsion of an anionic emulsion polymerized polydiorganosiloxane, an emulsion of an emulsion polymerized copolymer of unsaturated organic monomer and at least one unsaturated organosilicon monomer, an emulsion of an organotin dicarboxylate, and a silane cross-linking agent such as methyltrimethoxysilane. When the water is removed from the emulsion, such as by drying, the product is an elastomer having improved physical properties as compared to a product in which a homopolymer emulsion of the organic monomer is present instead of the emulsion polymerized copolymer. This invention also includes the blended emulsions of the above method, and the cured product produced by the method.

DESCRIPTION OF THE INVENTION

This invention relates to a method of blending aqueous emulsions to provide an elastomeric product upon devolatilization comprising:

(I) mixing
  (A) an aqueous emulsion of an anionic emulsion polymerized hydroxyl endblocked polydiorganosiloxane, said hydroxyl endblocked polydiorganosiloxane having a weight average molecular weight of at least 5,000, the organo groups being selected from the group consisting of monovalent hydrocarbon radicals containing less than seven carbon atoms per radical and 2-(perfluoroalkyl)ethyl radicals containing less than seven carbon atoms per radical, and
  (B) an aqueous emulsion of an emulsion polymerized copolymer consisting essentially of free radical polymerized monomers selected from at least one unsaturated organic monomer and at least one unsaturated organosilicon monomer, selected from the group comprising any unsaturated silane, siloxane, or silazane that will both copolymerize with the unsaturated organic monomer or mixture of unsaturated organic monomers used and will form ≡SiOH under the conditions of the emulsion polymerization method used to produce the copolymer, said copolymer being produced from 1 to 7 weight percent unsaturated organosilicon monomer and 93 to 99 weight percent unsaturated organic monomer; to form a mixture of emulsions, (II) adjusting the mixture to a pH of 7 or greater, (III) adding with agitation an amount of aqueous emulsion, (C), of an alkyl tin salt to provide from 0.1 to 2 parts by weight of alkyl tin salt, for each 100 parts by weight of polydiorganosiloxane, and thereafter (IV) adding with agitation an amount of silane crosslinking agent (D) to obtain crosslinking, said silane crosslinking agent having the general formula $A_m Si(OR)_{4-m}$ wherein A is a member selected from the group consisting of a hydrogen atom, monovolent hydrocarbon radicals containing 1 to 6 inclusive carbon atoms, and monovalent halohydrocarbon radicals containing 1 to 6 inclusive carbon atoms, R is a member selected from the group consisting of a hydrogen atom, an alkyl group containing 1 to 4 inclusive carbon atoms,

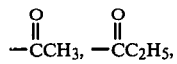

and —$CH_2CH_2OC_2H_5$ group and m is 0 or 1, there being, for each 100 parts by weight of polydiorganosiloxane in (A) sufficient (B) to provide from 5 to 60 parts by weight of emulsion polymerized copolymer.

Ingredient (A) used in the method of this invention is an emulsion of an anionic emulsion polymerized polydiorganosiloxane. The polydiorganosiloxane produced in this manner is hydroxyl endblocked. Such hydroxyl endblocked polydiorganosiloxanes should have a weight average molecular weight ($M_w$) of at least 5,000. Hydroxyl endblocked polydiorganosiloxanes with low $M_w$ do not provide strong elastomeric products in this invention. Tensile strengths and elongations at break improve with increasing molecular weight, with reasonable tensile strengths and elongations obtained above 30,000 $M_w$ and the best tensile strengths and elongations obtained above 50,000 $M_w$. The maximum weight average molecular weight is one which can be emulsified and which will give elastomeric properties to the product obtained after the water is removed from the emulsion. Weight average molecular weights up to 1,000,000 for the hydroxyl endblocked polydiorganosiloxane are expected to be practical for this invention. The preferred $M_w$ for the hydroxylated polydiorganosiloxanes are in the range of 200,000 to 700,000. The viscosity of the polymer obtained upon removal of the water from the emulsion will vary from about 75 Pa.s at 25° C. to about 6,000 Pa.s at 25° C. with the preferred range from about 1,000 Pa.s at 25° C. to 3,000 Pa.s at 25° C.

The organic radicals of the hydroxyl endblocked polydiorganosiloxane can be monovalent hydrocarbon radicals containing less than seven carbon atoms per radical and 2-(perfluoroalkyl)ethyl radicals containing less than seven carbon atoms per radical. Examples of monovalent hydrocarbon radicals include methyl, ethyl, propyl, butyl, isopropyl, pentyl, hexyl, vinyl, cyclohexyl and phenyl and examples of 2-(perfluoroalkyl)ethyl radicals include 3,3,3-trifluoropropyl and 2-(perfluorobutyl)ethyl. The hydroxyl endblocked polydiorganosiloxanes preferably contain organic radicals in which at least 50 percent are methyl. The hydroxyl endblocked polydiorganosiloxanes are essentially linear polymers containing two organic groups per silicon atom but may include trace amounts of monoorganosiloxy or triorganosiloxy groups present as impurities of the manufacturing process. The preferred hydroxyl endblocked polydiorganosiloxanes are the hydroxyl endblocked polydimethylsiloxanes.

The most preferred hydroxyl endblocked polydiorganosiloxanes are those prepared by the method of anionic emulsion polymerization described by Findlay et al. in U.S. Pat. No. 3,294,725 which is hereby incorporated by reference to show the methods of polymerization and to show the hydroxyl endblocked polydiorganosiloxane in emulsion. Another method of preparing hydroxyl endblocked polydiorganosiloxane in emulsion is described by Hyde et al. in U.S. Pat. No. 2,891,920 which is hereby incorporated by reference to show the hydroxyl endblocked polydiorganosiloxanes and their method of preparation. They are made anionic for use in this invention. These methods and others are known in the art. The hydroxyl endblocked polydiorganosiloxanes of this invention are those which are anionically stabilized. For the purpose of this invention, "anionically stabilized" means the hydroxyl endblocked polydiorganosiloxane is stabilized in emulsion with an anionic surfactant.

Anionic surfactants are preferably the salt of the surface active sulfonic acids used in the emulsion polymerization to form the hydroxyl endblocked polydiorganosiloxane as shown in U.S. Pat. No. 3,294,725 cited above which is hereby incorporated by reference to show the surface active sulfonic acids and salts thereof. The alkali metal salts of the sulfonic acids are preferred, particularly the sodium salts. The sulfonic acid can be illustrated by aliphatically substituted benzenesulfonic acids, aliphatically substituted naphthalene sulfonic acids, aliphatic sulfonic acids, silylalkylsulfonic acids and aliphatically substituted diphenylethersulfonic acids.

Other anionic emulsifying agents can be used, for example, alkali metal sulforicinoleates, sulfonated glyceryl esters of fatty acids, salts of sulfonated monovalent alcohol esters, amides of amino sulfonic acids such as the sodium salt of oleyl methyl tauride, sulfonated aromatic hydrocarbon alkali salts such as sodium alpha-naphthalene monosulfonate, condensation products of naphthalene sulfonic acids with formaldehyde, and sulfates such as ammonium lauryl sulfate, triethanol amine lauryl sulfate and sodium lauryl ether sulfate.

Although not specifically required in the present invention, one can optionally include nonionic emulsifying agents in addition to the anionic emulsifying agents. Such nonionic emulsifying agents can be illustrated by saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine.

Ingredient (B) used in the method of this invention is an emulsion of an emulsion polymerized copolymer. The copolymer consists essentially of free radical polymerized monomers selected from at least one unsaturated organic monomer and at least one unsaturated organosilicon monomer. The copolymer is made from 1 to 7 weight percent unsaturated organosilicon monomer and from 93 to 99 weight percent organic monomer. It is believed that any of the unsaturated organic monomers commonly used to form polymers through free radical polymerization can be used in this invention, either by themselves or in combination: Styrene, methylmethacrylate, and vinyl chloride have been shown to be useful in this invention. The unsaturated organosilicon monomer can be an unsaturated silane, siloxane, or silazane that will both copolymerize with the unsaturated organic monomer or mixture of unsaturated organic monomers used and will form ≡SiOH under the conditions of the emulsion polymerization method used to produce the copolymer.

The unsaturated organosilicon monomer can be a silane of the formula $R'R''_xSi(R''')_{3-x}$ where R' is an olefinic unsaturated radical such as vinyl, allyl, acryloxypropyl, or methacryloxypropyl, R" is an alkyl radical containing 1 to 4 inclusive carbon atoms or a phenyl radical, and R''' is a hydrolyzable group such as —OR", —OCOR", or halogen, and x is an integer of from 0 to 2 inclusive. The unsaturated organosilicon monomer can be a disiloxane of the formula R'R"$_2$Si—O—SiR"$_2$R' where R' and R" are as defined. The unsaturated organosilicon monomer can be a cyclic siloxane of the formula (R'R"SiO)$_a$ where R' and R" are as defined and a is from 3 to 6 inclusive. The unsaturated organosilicon monomer can be a disilazane of the formula R'R"$_2$Si—NH—SiR"$_2$R' where R' and R" are as defined. The unsaturated organosilicon monomer can be a cyclic silazane of the formula (R'R"SiNH)$_3$ where R' and R" are as defined. A preferred unsaturated organosilicon monomer is vinyltriethoxysilane.

Examples of unsaturated organosilicon monomer include silanes such as ViMeSiCl$_2$, ViMe$_2$SiOMe, ViMeSi(OEt)$_2$, and ViSi(OEt)$_3$, siloxanes such as (ViMe$_2$Si)$_2$O, (ViMeSiO)$_3$, and (ViMeSiO)$_a$ where a is 3 to 6 inclusive, and silazanes such as (ViMe$_2$Si)$_2$NH and (ViMeSiNH)$_3$ where Me is methyl radical and Vi is vinyl radical.

The unsaturated organic monomer and the unsaturated organosilicon monomer can be emulsion polymerized by the common methods of performing such copolymerizations. One such process is described by Backderf in U.S. Pat. No. 3,706,697 which is hereby incorporated by reference to show a process for copolymerizing an acrylic ester and an acryloxyalkylalkoxysilane by emulsion polymerization of the organic monomer through a free radical generator.

A method of copolymerizing styrene and vinyltriethoxysilane is illustrated in the examples of this invention. A mixture is prepared of water and an anionic surfactant, then a mixture of styrene and vinyltriethoxysilane is slowly added under a nitrogen blanket. Ammonium persulfate is used as the polymerization catalyst. Heating the mixture initiates the polymerization, but it is also necessary to control the reaction temperature so that the emulsion does not overheat due to the exothermic reaction. After polymerization is completed, the emulsion is adjusted to a pH of greater than 7.

The method of this invention requires from 5 to 60 parts by weight of the emulsion polymerized copolymer for each 100 parts by weight of polydiorganosiloxane. If the method of this invention is followed without adding an emulsion of an emulsion polymerized copolymer, the final product is a soft, sticky, polydiorganosiloxane gum which is not useful as an elastomeric product. The addition of the copolymer serves to act as a reinforcement or filler for the polydiorganosiloxane. The lower amounts of copolymer serve to change the surface characteristics and nature of the polydiorganosiloxane. Amounts of from 5 to 25 parts added yield a reinforced polydiorganosiloxane suitable for coating substrates, for instance fabric, to provide the fabric with desirable characteristics. When the amount of copolymer added is from 25 to 60 parts by weight, the final product obtained by drying the emulsion is a high strength elastomer. The more copolymer added, the harder and less elastic the final product becomes. The maximum amount of copolymer that can be added and still obtain an elastomeric product is in the range of 60 parts by weight of the copolymer per 100 parts of the polydiorganosiloxane. If an emulsion of an emulsion polymerized organic monomer is used in place of the emulsion of an emulsion polymerized copolymer as called for in this invention, the physical properties of the cured elastomeric product are not as desirable. The copolymer specified in the method of this invention particularly yields a cured elastomeric product having higher tear strengths than those products using a homopolymer containing only the organic polymer.

The method of this invention uses an aqueous emulsion, (C), of an alkyl tin salt to catalyze the curing of the final emulsion during the devolatilization of the final emulsion to yield and elastomeric product. Preferred salts are dialkyltin dicarboxylates such as dibutyltindiacetate, dibutyltindilaurate, and dioctyltindilaurate. Most preferred is dibutyltindilaurate. The emulsion of catalyst is used in an amount sufficient to yield from 0.1 to 2 parts by weight of the alkyl tin salt for each 100 parts by weight of polydiorganosiloxane. Larger amounts could be used, but the larger amount would serve no useful purpose.

The method of this invention requires a silane cross-linking agent, (D), of the general formula A$_m$Si(OR)$_{4-m}$. It is possible to obtain elastomeric products following the method of this invention without using a silane cross-linking agent, but the physical properties of the final product are not as desirable. The radical A, in the silane cross-linking agent is a member selected from the group consisting of the hydrogen atom, monovalent hydrocarbon radicals containing 1 to 6 inclusive carbon atoms and monovalent halohydrocarbon radicals containing 1 to 6 inclusive carbon atoms. Preferred radicals are methyl, ethyl, phenyl, and 3,3,3-trifluoropropyl with methyl being most preferred. The radical R is a hydrogen atom, an alkyl group containing 1 to 4 inclusive carbon atoms,

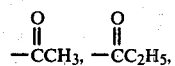

—CH$_2$CH$_2$OH, —CH$_2$CH$_2$OCH$_3$, or a —CH$_2$CH$_2$OC$_2$H$_5$ group. The R radicals on a silane molecule can be the same or different. The number of a radicals can be 0 or 1, meaning that a silane molecule can be either tri or tetra-functional in order to function as a cross-linker in the curing of the final emulsion of this invention. The OR group on the silane is a hydrolyzable group that forms ≡SiOH under the curing conditions of the method of this invention. The preferred silane cross-linking agent is methyltrimethoxysilane. The silane crosslinking agent is present in a sufficient amount to obtain the desired degree of crosslinking. The minimum amount of crosslinker required is that amount necessary to show an increase in the tensile strength or tear strength of the cured elastomer. The amount to be used depends upon the hydroxyl content of the polydiorganosiloxane and the molecular weight of the crosslinking agent chosen. The more crosslinking agent used, the harder and less elastic the product becomes. Useful amounts of the preferred methyltrimethoxysilane crosslinker have been found to vary from 1 to 7 parts by weight of silane per 100 parts by weight of polydiorganosiloxane.

The method of this invention requires mixing an emulsion of an anionic emulsion polymerized polydiorganosiloxane, and an emulsion of an emulsion polymerized copolymer, the mixed emulsions having a pH of 7 or greater. A desirable method of meeting the requirement of a pH of 7 or greater for the mixture is to adjust the pH of each emulsion to 7 or greater before mixing them together. The emulsion of alkyl tin salt is then added to the mixture. These three emulsions can be mixed in any order by simply stirring until uniform. The silane cross-linking agent is then slowly added to the mixture with adequate stirring to prevent any localized concentration of the silane in the mixed emulsion which might cause coagulation of one or more of the emulsions due to the by product given off during the hydrolysis of the cross-linker silane. The mixture of emulsions (A), (B), and (C) must be neutral or slightly basic before the addition of the silane. If the mixture is acidic, the physical properties of the elastomeric product formed on devolatilization of the final emulsion are not of a desirable level.

The method of this invention yields an emulsion blend which provides an elastomeric product upon devolatilization, the elastomeric product having more desirable physical properties than a product produced from previously known emulsions of polydiorganosiloxane.

The elastomeric product produced by devolatilization of the blend of emulsions produced by the method of this invention is useful as a coating such as a paint to protect a substrate, as a coating for textiles to modify their surface, and as a coating for papers and films to provide a modified surface to improve such properties as water repellency and the release of many substances which normally adhere to papers and films. As a release coating on paper the amount of force required to obtain release can be varied by adjusting the weight ratio of polydiorganosiloxane to copolymer. As the ratio of polydiorganosiloxane to copolymer is lowered, the higher the force required to obtain release.

The following examples are presented for purposes of illustrating the invention and should not be construed as limiting the scope of the invention which is properly delineated in the claims. All parts are parts by weight.

EXAMPLE 1

An anionic emulsion polymerized polydimethylsiloxane was prepared.

A mixture of 40 parts deionized water, 1 part of dodecylbenzene sulfonic acid, and 40 parts of mixed polydimethylcyclosiloxanes (cyclics) having 4, 5, and 6 units was prepared. The mixture was homogenized at 33 MPa for 2 cycles. Then 1 part of dodecylbenzene sulfonic acid was mixed in and the mixture heated for 2 hours to a temperature of approximately 85° C. Then an additional 20 parts of water was added and the mixture was stored at room temperature for several weeks. The mixture was then neutralized with a 4 percent solution of NaOH to a pH of 7.4. The viscosity of a sample of the hydroxyl endblocked polydimethylsiloxane fluid recovered from the emulsion was 1,300 Pa.s with a solids content of 38.5 percent, (Emulsion A).

An emulsion polymerized copolymer was also prepared. A mixture of 360 parts of distilled water and 22.8 parts of an anionic surfactant (sodium salt of alkylaryl polyether sulfonate) was prepared in a 1000 ml-3 necked flask with a nitrogen purge. Then 1.2 parts of ammonium persulfate and $\frac{1}{3}$ of a mixture of 200 parts of styrene and 5 parts of vinyltriethoxysilane was added to the flask with vigorous stirring. The reaction mixture was heated to 72° C., the exotherm then carried the temperature to 95° C. Within $\frac{1}{2}$ hour, the temperature dropped to 85° C. The remaining $\frac{2}{3}$ of the monomer mixture was added over a $1\frac{1}{2}$ hour period with the temperature between 85° C. and 75° C. The mixture was heated to 85° C. and additional ammonium persulfate added. The polymerized mixture was cooled to room temperature, then adjusted to a pH of 7.5 with 36 ml of 0.25 N sodium hydroxide solution. The solids content was determined to be 34.5 percent, (Emulsion B).

An emulsion mixture of 100 parts of Emulsion A, 44.5 parts of Emulsion B, and 1.92 parts of a 20 weight percent emulsion of dibutyltindilaurate was prepared. While stirring the emulsion mixture, 1.5 parts of methyltrimethoxysilane crosslinker was added. The mixture was allowed to stand for one hour, then poured into a shallow container and allowed to dry over a 14 day period. The elastomeric film that was formed had a ratio of approximately 100 parts of polydimethylsiloxane and 40 parts of copolymer having 100 parts of polystyrene and 1 part of $ViSiO_{3/2}$. The cured film was tested for durometer in accordance with ASTM D 2240, for tensile strength and percent elongation at break in accordance with ASTM D 412, and for tear, die B, in accordance with ASTM D 624. The results are shown in Table I.

EXAMPLE 2

A comparative example was prepared.

The procedure of Example 1 was followed except Emulsion B was prepared without the addition of the vinyltriethoxysilane. The cured film was tested as in Example 1 with the results shown in Table I.

TABLE I

| Example | 1 | 2* |
|---|---|---|
| Durometer | 35 | 34 |
| Tensile Strength, MPa | 4.96 | 1.86 |
| Elongation, percent | 1050 | 1000 |
| Tear, kN/m | 18.9 | 9.3 |

MPa = megaPascal
kN/m = kilonewton per meter
*comparative example

Without the copolymer containing a functional silane, the organic polymer does not act as an efficient reinforcing agent for the polydimethylsiloxane as evidenced by the much lower tensile and tear strengths.

EXAMPLE 3

A series of experiments were performed with various ratios of styrene to vinyltriethoxysilane in the copolymer and with various ratios of polydimethylsiloxane to copolymer.

An anionic emulsion polymerized polydimethylsiloxane was prepared as in Example 1 except the time before neutralization was not as long. The hydroxyl endblocked polydimethylsiloxane fluid recovered from the emulsion had a viscosity of 175 Pa.s, (Emulsion C).

An emulsion polymerized copolymer was prepared as in Example 1 except that ratio of styrene to vinyltriethoxysilane was 100 to 5 rather than 100 to 2.5 as in Example 1. This new copolymer emulsion is Emulsion D.

A series of emulsion mixtures were then prepared using the above described emulsions, the mixtures being prepared as described in Example 1. The ratios of ingredients were as shown in Table II. The emulsion mixtures were made into films and tested as in Example 1. The results are shown in Table II. Using a copolymer gave better physical properties than using an organic homopolymer. The use of the methyltrimethoxysilane crosslinker was shown to improve the strength of cured films. The samples prepared without the crosslinker showed that the copolymer was necessary in order to obtain a cure. Without the copolymer or crosslinker, no cure took place. The organic tin salt catalyst was also shown to be necessary.

The emulsion mixture was neutral or basic in each case. As identical series of experiments in which the emulsions remained acidic yielded only soft, cheesy material upon drying.

These copolymer emulsions were then combined with Emulsion C of Example 3, a polydimethylsiloxane of 175 Pa.s viscosity. Typical results of these experiments are shown in Table IV for a mixture of 100 parts of polydimethylsiloxane with 50 parts of copolymer, 1 part of catalyst of Example 1 and 3 parts of crosslinker of Example 1. The mixtures were made into films and tested as in Example 1.

In each case the copolymer gave tear properties significantly higher than those of the homopolymer.

TABLE II

| Copolymer ratio* | Catalyst parts | Crosslinker parts | Durometer | Tensile Strength MPa | Elongation percent | Tear Strength kN/m |
|---|---|---|---|---|---|---|
| **100/0.0 | 30 | 1 | 3 | 23 | 1.3 | 700 | 7.9 |
| 100/2.5 | 30 | 1 | 3 | 47 | 2.1 | 425 | 15.2 |
| 100/5.0 | 30 | 1 | 3 | 47 | 1.2 | 450 | 14.7 |
| 100/2.5 | 40 | 1 | 3 | 45 | 2.1 | 450 | 19.6 |
| 100/2.5 | 50 | 1 | 3 | 58 | 2.2 | 500 | 21.4 |
| **100/2.5 | 50 | none | none | uncured soft, sticky gum | | | |
| **100/2.5-12 | 50 | 1 | none | 21 | 0.03 | — | 2.6 |

Each sample based on 100 parts of polydimethylsiloxane from Emulsion C
*Ratio of styrene to vinyltriethoxysilane used to prepare copolymer
**Comparative examples

EXAMPLE 4

A series of anionic emulsion polymerized polydimethylsiloxanes were prepared of different viscosities.

The procedure of Example 1 was followed, varying the time and temperature before neutralization to yield emulsions containing polydimethylsiloxane of various viscosities. These emulsions were then mixed with copolymer, catalyst, and crosslinker as in Example 1. The mixtures were dried into films and tested as in Example 1. The results obtained when 100 parts of the polydimethylsiloxane emulsions were mixed with 40 parts of Emulsion B (100 parts styrene to 2.5 parts vinyltriethoxysilane), 1 part of catalyst, and 3 parts of crosslinker were as shown in Table III. When these same emulsions were mixed with the emulsion of Example 2 (the styrene homopolymer) the tear strengths varied from 8.9 to 10.0 kN/m.

TABLE III

| Polydimethylsiloxane Viscosity, Pa · s | Durometer | Tensile Strength MPa | Elongation percent | Tear KN/m |
|---|---|---|---|---|
| 173 | 45 | 2.1 | 450 | 19.6 |
| 816 | 42 | 4.0 | 950 | 24.5 |
| 1320 | 35 | 5.0 | 1050 | 18.9 |
| 5616 | 35 | 3.6 | 950 | 16.6 |

EXAMPLE 5

Copolymer emulsions were prepared using various unsaturated organic monomers. These copolymer emulsions were then used to reinforce a polydimethylsiloxane.

The procedure of Example 1 was followed to make an emulsion copolymer except that polyvinylchloride was used in place of styrene, and the reaction was carried out under pressure.

The procedure of Example 2 was followed to make an emulsion homopolymer except that polyvinylchloride was used in place of styrene, and the reaction was carried out under pressure.

Another pair of emulsions were made as in Example 1 using methylmethacrylate as the organic monomer.

TABLE IV

| Reinforcement | Durometer | Tensile Strength MPa | Elongation percent | Tear Strength kN/m |
|---|---|---|---|---|
| styrene homopolymer | 35 | 1.2 | 750 | 7.0 |
| 100 styrene/2.5 silane | 58 | 2.3 | 500 | 21.4 |
| PVC homopolymer | 42 | 1.9 | 800 | 8.8 |
| 100 PVC/2.5 silane | 50 | 2.0 | 300 | 14.9 |
| PMMA | 24 | 2.6 | 1200 | 10.5 |
| 100 PMMA/2.5 silane | 59 | 3.9 | 750 | 21.9 |

PVC = polyvinylchloride
PMMA = polymethylmethacrylate
silane = vinyltriethoxysilane That which is claimed is:

1. A method of blending aqueous emulsions to provide an elastomeric product upon devolatization comprising:
    (I) mixing
        (A) an aqueous emulsion of an anionic emulsion polymerized hydroxyl endblocked polydiorganosiloxane, said hydroxyl endblocked polydiorganosiloxane having a weight average molecular weight of at least 5000, the organo groups being selected from the group consisting of monovalent hydrocarbon radicals containing less than seven carbon atoms per radical and 2-(perfluoroalkyl)ethyl radicals containing less than seven carbon atoms per radical, and
        (B) an aqueous emulsion of an emulsion polymerized copolymer consisting essentially of free radical polymerized monomers selected from at least one unsaturated organic monomer and at least one unsaturated organosilicon monomer selected from the group consisting any unsaturated silane, siloxane, or silazane that will both copolymerize with the unsaturated organic monomer or mixture of unsaturated organic monomers used and will form ≡SiOH under the conditions of the emulsion polymerization method used to produce the copolymer, said copolymer being produced from 1 to 7 weight percent unsaturated organosilicon monomer and 93 to 99 weight percent unsaturated organic monomer, to form a mixture of emulsions, (II) adjusting the mixture to a pH of 7 or greater,
(III) adding with agitation an amount of aqueous emulsion, (C), of an alkyl tin salt to provide from 0.1 to 2 parts by weight of alkyl tin salt for each 100 parts by weight of polydiorganosiloxane, and thereafter
(IV) adding with agitation an amount of silane crosslinking agent, (D), to obtain crosslinking, said silane crosslinking agent having the general formula $A_mSi(OR)_{4-m}$ wherein A is a member selected from the group consisting of a hydrogen atom, monovalent hydrocarbon radicals containing 1 to 6 inclusive carbon atoms and monovalent halohydrocarbon radicals containing 1 to 6 inclusive carbon atoms, R is a member selected from the group consisting of a hydrogen atom, an alkyl group containing 1 to 4 inclusive carbon atoms,

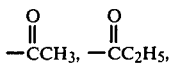

$-CH_2CH_2OH$, $-CH_2CH_2OCH_3$, and $-CH_2CH_2OC_2H_5$ group and m is 0 or 1, there being for each 100 parts by weight of polydiorganosiloxane in (A) sufficient (B) to provide from 5 to 60 parts by weight of emulsion polymerized copolymer.

2. The method of claim 1 in which (A) is an emulsion of a polydimethylsiloxane polymerized in the presence of a surface active sulfonic acid catalyst, and (B) is an emulsion polymerized copolymer of a vinyl containing organic monomer and an unsaturated organosilicon monomer of the formula $$R'R''_xSi(R''')_{3-x}$$

wherein R' is an olefinic unsaturated radical, R'' is an alkyl radical containing 1 to 4 inclusive carbon atoms or a phenyl radical, R''' is selected from the group consisting of —OR'', —OCOR'', and halogen, and x is an integer or from 0 to 2 inclusive, there being from 25 to 60 parts by weight of emulsion polymerized copolymer for each 100 parts by weight of the polydiorganosiloxane.

3. The method of claim 2 in which (B) is an emulsion polymerized copolymer in which R' is a vinyl radical, (C) is dibutyl tin dilaurate, and (D) is methyltrimethoxysilane present in an amount of from 1 to 7 parts by weight.

4. The method of claim 3 in which (B) is an emulsion polymerized copolymer of styrene and vinyltriethoxysilane.

5. A blend of aqueous emulsions comprising a product obtained by mixing
(A) an aqueous emulsion of an anionic emulsion polymerized hydroxyl endblocked polydiorganosiloxane, said hydroxyl endblocked polydiorganosiloxane having a weight average molecular weight of at least 5000, the organo groups being selected from the group consisting of monovalent hydrocarbon radicals containing less than seven carbon atoms per radical and 2-(perfluoroalkyl)ethyl radicals containing less than seven carbon atoms per radical,
(B) an aqueous emulsion of an emulsion polymerized copolymer consisting essentially of free radical polymerized monomers selected from at least one unsaturated organic monomer and at least one unsaturated organosilicon monomer selected from the group comprising any unsaturated silane, siloxane, or silazane that will simultaneously copolymerize with the unsaturated organic monomer or mixture of unsaturated organic monomers used and will form ≡SiOH under the conditions of the emulsion polymerization method used to produce the copolymer, said copolymer being produced from 1 to 7 weight percent unsaturated organosilicon monomer and 93 to 99 weight percent unsaturated organic monomer,
(C) an aqueous emulsion of an alkyl tin salt, and
(D) a silane crosslinking agent having the general formula $A_mSi(OR)_{4-m}$ wherein A is a member selected from the group consisting of a hydrogen atom, monovalent hydrocarbon radicals containing 1 to 6 inclusive carbon atoms and monovalent halohydrocarbon radicals containing 1 to 6 inclusive carbon atoms, R is a member selected from the group consisting of a hydrogen atom, an alkyl group containing 1 to 4 inclusive carbon atoms,

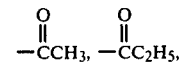

$-CH_2CH_2OH$, and $-CH_2CH_2OCH_3$ and $-CH_2CH_2OC_2H_5$ group and m is 0 or 1, the product having a pH of 7 or greater, there being, for each 100 parts by weight of polydiorganosiloxane in (A), sufficient (B) to provide from 5 to 60 parts by weight of emulsion polymerized copolymer, sufficient (C) to provide from 0.1 to 2 parts by weight of alkyl tin salt for each 100 parts by weight of polydiorganosiloxane, and an amount of (D) to provide crosslinking.

6. The blend of claim 5 in which (A) is an emulsion of a polydimethylsiloxane polymerized in the presence of a surface active sulfonic acid catalyst, and (B) is an emulsion polymerized copolymer of a vinyl containing organic monomer and an unsaturated organosilicon monomer of the formula $$R'R''_xSi(R''')_{3-x}$$

wherein R' is an olefinic unsaturated radical, R'' is an alkyl radical containing 1 to 4 inclusive carbon atoms or a phenyl radical, R''' is selected from the group consisting of —OR'', —COR'', and halogen, and x is an integer of from 0 to 2 inclusive, there being from 25 to 60 parts by weight of emulsion polymerized copolymer for each 100 parts by weight of the polydiorganosiloxane.

7. The blend of claim 6 in which (B) is an emulsion polymerized copolymer in which R' is a vinyl radical, (C) is dibutyl tin dilaurate, and (D) is methyltrimethoxysilane present in an amount of from 1 to 7 parts by weight.

8. The blend of claim 7 in which (B) is an emulsion polymerized copolymer of styrene and vinyltriethoxysilane.

9. The elastomeric product obtained by the devolatilization of the blend of claim 5.

10. The elastomeric product obtained by the devolatilization of the blend of claim 6.

11. The elastomeric product obtained by the devolatilization of the blend of claim 7.

12. The elastomeric product obtained by the devolatilization of the blend of claim 8.

* * * * *

UNITED STATES PATENT AND TRADEMARK OFFICE
CERTIFICATE OF CORRECTION

PATENT NO. : 4,288,356
DATED : September 9, 1981
INVENTOR(S) : David J. Huebner and Donald R. Weyenberg It is certified that error appears in the above—identified patent and that said Letters Patent is hereby corrected as shown below:

Column 3, - after the formula read "$-CC_2H_5$," insert $-CH_2CH_2OH$, $-CH_2CH_2OCH_3$,"

Column 6, line 12 - the word "and" should read "an"

Column 6, line 43 - the word "a" should read "A"

Table II - the number reading "2.5-" should read "2.5"

Table II - the number "12" should be deleted

Signed and Sealed this

Twentieth Day of April 1982

[SEAL]

Attest:

*Attesting Officer*

GERALD J. MOSSINGHOFF
*Commissioner of Patents and Trademarks*